United States Patent

Weimar, Jr.

[15] 3,660,151
[45] May 2, 1972

[54] POLYESTER YARNS FOR REINFORCING RUBBER ARTICLES

[72] Inventor: Richard David Weimar, Jr., Grifton, N.C.
[73] Assignee: E. I. du Pont de Nemours and Company, Wilmington, Del.
[22] Filed: Mar. 16, 1970
[21] Appl. No.: 20,147

Related U.S. Application Data

[63] Continuation-in-part of Ser. No. 819,470, Apr. 25, 1969, abandoned.

[52] U.S. Cl. .................................117/138.8 F, 117/76 T
[51] Int. Cl. ..................B32b 27/02, B32p 27/36, B44d 1/14
[58] Field of Search ...............117/139.5 CI, 138.8 F, 169 R; 260/DIG. 16

[56] References Cited

UNITED STATES PATENTS

| | | | |
|---|---|---|---|
| 3,282,723 | 11/1966 | Melillo | 117/138.8 F |
| 3,216,187 | 11/1965 | Chantry et al. | 57/140 |
| 2,734,001 | 2/1956 | Mecklenburgh et al. | 117/169 R |
| 2,086,544 | 7/1937 | Dreyfus | 117/139.5 CI |
| 3,463,665 | 8/1969 | Quinn | 117/169 R |
| 3,383,242 | 5/1968 | Macura et al. | 117/138.8 F |

OTHER PUBLICATIONS

Fatzer et al., Metallizing A Polyester Substrate, IBM Technical Disclosure, Vol. 6, No. 8, Jan. 1964
Haddad, Coating Polymeric Material, IBM Technical Disclosure, Vol. 6, No. 9, Feb. 1964

*Primary Examiner*—William D. Martin
*Assistant Examiner*—Sadie L. Childs
*Attorney*—Norris E. Ruckman

[57] ABSTRACT

An improvement is disclosed in high-strength polyester yarn for use in reinforced rubber articles such as tires. When drawn filaments of polyethylene terephthalate having a relative viscosity of 40 or more are heated in contact with rubber, degradation is caused by amine-producing accelerators commonly used in rubber compounds. This degradation is prevented by a durable surface coating on the polyester of a salt of a metal having a atomic number of 22–30 or 40–48, such as zinc sulfate or ferric ammonium sulfate.

5 Claims, No Drawings

POLYESTER YARNS FOR REINFORCING RUBBER ARTICLES

REFERENCE TO RELATED APPLICATION

This is a continuation-in-part of my copending application Ser. No. 819,470 filed Apr. 25, 1969, and now abandoned.

FIELD OF THE INVENTION

This invention relates to novel polyester filamentary material and more particularly to improved polyester yarns suitable for reinforcement of rubber articles.

DESCRIPTION OF THE PRIOR ART

The synthetic linear polyesters described by Winfield and Dickson in U.S. Pat. No. 2,465,319 have become well-known articles of commerce with the outstanding example being fibers and filaments prepared from polyethylene terephthalate. Such filamentary materials provide excellent performance in uses requiring good strength, high modulus, low sensitivity to moisture, good resistance to abrasion and to degradation upon exposure to light, heat, and corrosive chemicals. In addition to the usual textile applications such as woven and knitted fabrics, polyester yarns have been found to be particularly useful in the reinforcement of rubber structures such as automobile tires, V-belts, rubber-covered tarpaulins, and the like. A particular variety of polyester yarns characterized by high strength and good flex life, suitable for use in high performance tires, has been described by Chantry and Molini in U.S. Pat. No. 3,216,187. Although polyester fibers are generally resistant to attack by chemical agents, it was pointed out by Daniels in U.S. Pat. No. 3,051,212 that fiber strength loss is observed when polyester fibers are heated in contact with rubber and that this strength loss, attributed to hydrolysis, can be greatly reduced if the free carboxyl content of the polymer making up the fiber is restricted to a very low value. Subsequently, it was shown in British Pat. No. 1,106,920 that polyester fibers are also subject to another type of degradation when heated in contact with many types of rubbers. This degradation was traced to attack by amines derived from certain types of accelerators widely used in compounding the rubber. It was further shown that strength loss resulting from attack by amines could be eliminated by using rubber compositions which did not contain the amine-producing accelerators. The use of amine-producing accelerators such as the sulphenamides, however, is highly desirable from other viewpoints in that they work well in rubber compounding and produce rubber with highly desirable properties. Restriction of use of polyester yarns to rubbers free of such accelerators, therefore, is an unacceptable limitation on yarn possessing otherwise excellent properties. Because of this, it is imperative that another way of eliminating the amine-caused degradation be found. The present invention provides a solution to this problem.

Polyester filamentary materials are coated with numberous types of chemical agents for various purposes. In the yarn manufacturing plant, for example, yarns are coated with lubricating agents and antistatic agents to provide ease of handling. Textile yarns intended for use in the manufacture of various types of fabrics may be coated with antisoiling agents, antistatic agents, sizes, antioxidants, "preservatives," fireproofing agents, ultraviolet-light screening agents, and many other types of materials. On the other hand, high tenacity yarns intended for use in the reinforcement of rubber articles must be free of any coating material which might inhibit or interfere with the adhesives used to bond the yarns or cords to rubber. Consequently, yarns of this type find themselves in a special class and usually bear only a lubricating finish as manufactured and prior to application of an adhesive. The present invention is concerned with a novel finishing treatment for high-tenacity polyester yarns in this special class which achieves a result hitherto unobtained.

SUMMARY OF THE INVENTION

The present invention provides a novel surface-coated high-tenacity polyester yarn suitable for reinforcing rubber articles. The invention further provides a coated polyester yarn highly resistant to attack by amines (aminolysis) and particularly suitable for reinforcing rubbers compounded with amine-producing accelerators. A method for preparing and using the coated yarn is also provided.

The high-strength yarn of drawn polyester filaments which is used for reinforcing tires and other rubber articles has been subject to degradation by amine-producing accelerators used in rubber compounds. This is particularly troublesome when the filaments are composed of polyethylene terephthalate having a relative viscosity above about 40 and have been drawn to provide yarns having tenacities greater than 10 grams per denier (referred to denier at break). This problem is overcome by the present invention wherein the improvement comprises (A) applying a durable surface coating on the polyester filaments of a compound of a metallic element having an atomic number within the ranges 22-30 and 40-43 to provide 2 to 40 gram-atoms of metallic element per million grams of filaments, and (B) the improved yarn so produced.

The metallic elements having atomic numbers of 22-30 and 40-43 comprise a class of transition elements of the periodic tables. Salts of metallic elements of atomic numbers 26-30 provide economical degradation-inhibitor coatings. Inorganic salts such as sulfates and nitrates are readily available. Preferred salts are zinc sulfate and ferric ammonium sulfate.

The invention also provides a process for preparing superior elastomeric articles reinforced with polyester filaments comprising the steps of applying a degradation inhibitor comprising a compound of the metal to drawn high-strength polyethylene terephthalate filaments having a relative viscosity above 40 to form a durable surface coating comprising 2 to 40 gram-atoms of the metal per million grams of filaments, coating the filaments further with adhesive for bonding polyester filaments to the elastomer, applying the elastomer to the coated filaments and curing the combined structure.

The term "high-strength polyester yarn" is intended to refer to yarns of sufficient strength to reinforce elastomeric materials. Yarns having a tenacity above about 7.5 gms./den. are suitable for many purposes. However, the preferred yarns are those having a tenacity greater than 10 gms./den. (referred to denier at break) described by Chentry and Molini in U.S. Pat. No. 3,216,187.

The invention has its greatest utility in connection with polyethylene terephthalate filaments having a relative viscosity above about 40. In filaments having a relative viscosity of less than 40, the average polymer chain length is such that a few chain breaks, resulting from attack by amines have a relatively small effect upon the filament strength. In contrast, filaments having a relative viscosity appreciably above 40 do show a significant decrease in strength when a few of the longer polymer chains are broken by amine attack.

The expression "durable surface coating" is intended to refer to coatings which are at least 60 percent retained when the coated filaments are passed through conventional commercially-used adhesive mixtures, as in a conventional dip-stretching process for the preparation of tire cord.

The degradation inhibitors useful in the present invention are compounds of metallic elements having atomic numbers 22-30 and 40-48. Suitable degradation inhibitors, therefore, may be chosen from salts of titanium, vanadium, chromium, manganese, iron, cobalt, nickel, copper and zinc. Other useful inhibitors include salts of zirconium, niobium, molybdenum, technetium, ruthenium, rhodium, palladium, silver, and cadmium.

It is necessary that the degradation inhibitor be present in sufficient quantity to give a concentration of 2-40 gram-atoms of the metallic element per million grams of filaments. At concentration levels greater than 40 gram-atoms per million grams, the metal salts chemically and mechanically interfere with cords-to-rubber adhesion. On the other hand, coatings with less than 2 gram-atoms of metallic element per million grams do not provide adequate protection against attack by amines.

Oxides of the metallic elements are not suitable degradation inhibitors for the present invention. Suitable metallic compounds are salts having a $$\rho_2^{140}$$

value of at least 0.2 as defined hereinafter. Such salts include, for example, chlorides of chromium, manganese, iron, cobalt, nickel, copper, zinc and ruthenium, the sulphates of manganese, iron, cobalt, nickel, copper and zinc, and the nitrates of chromium, iron, cobalt, zinc, silver and cadmium. Other suitable metallic compounds include $FeNH_4(SO_4)_2 \cdot 12H_2O$, $Fe_4[Fe(CN)C6]_3$, $Na_3Co(NO_2)_6$ and cupric acetate.

The degradation-inhibitor coating may be applied to the polyethylene terephthalate filaments in any suitable manner. In a preferred embodiment of the invention, a salt of the metallic element is incorporated in a conventional finish and applied to drawn yarns during a beaming operation by inserting an applicator and dryer between the creel and the beam winding station. Alternatively, the metallic salt may be applied to the drawn polyethylene terephthalate filaments, either as yarns or cords, in a separate manufacturing step by dissolving or dispersing the metallic salt in a liquid, applying the liquid to the filaments and drying the filaments. The latter procedure may be carried out on apparatus similar to commercial dip-stretch equipment used to apply adhesive coatings to cords. In another preferred embodiment of the invention, the liquid mixture is applied to drawn yarn during yarn manufacture.

As indicated previously, suitable metallic compounds have a $$\rho_2^{140}$$

value of at least 0.2. The $$\rho_2^{140}$$

function is a measure of the ability of a compound to absorb and retain amines at elevated temperatures. Although we do not wish to be bound by theory, it is assumed that a compound having a high $$\rho_2^{140}$$

value, uniformly distributed on the surface of polyester filaments, will absorb the amines produced by break-down of rubber accelerators and thereby prevent those amines from attacking the polyester filament itself.

Determination of values of $\rho_2^{140}$

Values of $$\rho_2^{140}$$

are conveniently determined for solid chemical compounds by the following test procedure:

A sample of the compound to be tested is ground to a fine powder (less than 100 mesh) and a sample of 1-1.5 mg. is weighed out with an accuracy of ±0.01 mg. A 3 mg. morpholine sample is also weighed to ±0.01 mg. and placed with the ground test compound in a standard melting point capillary tube (1 mm. inside diameter) which is subsequently sealed to give a sealed length of 3-4 cm. The tube containing the morpholine and test compound is heated at a temperature of 140° C. for 2 hours (120 min.) and then inserted into the sample receiving section of a vapor-phase chromatograph where the tube is broken and the uncombined amine is determined by normal vapor-phase chromatographic techniques.

The $$\rho_2^{140}$$

values reported here are determined with a Model 500 vapor-phase chromatograph obtained from the F & M Scientific Division of Hewlett-Packard, Wilmington, Delaware. The chromatograph column, a 0.25 in. ×4 ft. (6.35 mm. × 1.22m.) stainless steel tube, is filled with Teflon packing having a coating of 5 percent by weight of 20,000 molecular-weight Carbowax and uses a W-2 detector element (a thermal conductivity detector). The chromatograph column is maintained at 150°±1° C. and the sample is carried through the column by a stream of helium gas at a flow rate of 37 ±5 ml./min. The detector block is maintained at a temperature of 281°±1° C., the injection port at 163°±3°C., and the attenuator setting is 128. The detector element output is recorded on a chromatograph chart and the area under the curve is determined by means of an integrator. The instrument is calibrated each day by running a tube containing a known weight of morpholine only. Calculation of results utilizes the relationship $A = (k\ m/f)$ where $A$ is the area under the chromatograph trace (or integrator value), $m$ is the mass of the eluted material (milligrams), $f$ is the flow rate of the carrier gas (ml./min.) and $k$ is the instrumental constant determined by calibration with a known sample.

In the test, the chromatograph gives a direct reading of the amount of morpholine not combined with the transition element compound. The amount of combined amine is calculated by subtracting the amount determined by the chromatograph from the amount originally inserted in the tube. The reported $$\rho_2^{140}$$

value is a ratio of the amount of combined morpholine (milligrams) to the weight of compound tested (milligrams), i.e., $$\rho_2^{140} = \frac{\mu}{\sigma}$$

where $\mu$ is the milligrams of combined morpholine and $\sigma$ is milligrams of compound tested. As indicated previously, compounds useful in the present invention must have a $$\rho_2^{140}$$

value of at least 0.2 to provide significant protection to polyethylene terephthalate filaments. Typical values of metal salts which are suitable degradation inhibitors are shown in the following table.

TABLE I

| Compound | $\rho_2^{140}$ |
|---|---|
| $ZnSO_4 \cdot H_2O$ | 0.46 |
| $ZnSO_4$ (anhydrous) | 0.62 |
| $FeNH_4(SO_4)_2 \cdot 12H_2O$ | 0.35 |
| $NiSO_4 \cdot 6H_2O$ | 0.62 |
| $Na_3Co(NO_2)_6$ | 0.32 |
| $Zn(NO_3)_2 \cdot 6H_2O$ | 0.25 |
| $Cd(NO_3)_2 \cdot 4H_2O$ | 0.25 |
| Cupric Acetate·$H_2O$ | 0.71 |

LABORATORY PAD TEST FOR AMINOLYSIS RESISTANCE

A suitable laboratory test for illustrating the effectiveness of the present invention in reducing polyester filament strength loss upon exposure to elastomeric articles compounded with amine-producing accelerators is as follows: The test consists essentially of preparing a polyester cord, coating it with an adhesive, embedding it in a test rubber pad, heating the rubber pad at a temperature of 160° C. for 16 hours and then measuring the breaking strength of the cord. The test is carried out on a laminated structure containing two plies of parallel, dipped tire cords, (20 ends/inch (7.9 ends/cm.) separated by a thin layer of rubber. The laminar structure is built up in successive layers consisting of a 125 mil. (3.17 mm.) sheet of unvulcanized rubber, a 15 mil. (0.38 mm.) sheet of unvulcanized rubber, a layer of parallel cords, two layers of 15 mil. (0.38 mm.) unvulcanized rubber, another layer of parallel cords, a 15 mil. (0.38 mm.) sheet of unvulcanized rubber and a final 125 mil. (3.17 mm.) layer of unvulcanized rubber. The laminate is then molded, vulcanized under a pressure of 210 lbs./sq.in. (14.8 kg./sq.cm.) at 150° C. for 40 minutes, and cut into 1-inch (2.5 cm.) wide strips for testing. Test strips are heated for 16 hours at 160° C. in 0.5 atmosphere of water vapor (simulating extremely severe tire running conditions) and then immersed in heptane for 4 days to soften the rubber and allow the cords to be pulled out without strain. Cord strength is determined at 25° C. on an Instron tensile tester using a sample length of 4 inches (10 cm.) and an elongation rate of 3 in./min. (7.6 cm./min.).

For proper interpretation of the above-described rubber pad test, it is appropriate to compare results in two rubber stocks, one of which is compounded with an accelerator capable of producing an amine, and the other being free of amines and amine-producing accelerators. For the tests reported here, the amine-containing rubber has the following compositions:

Rubber-Stock A

| Ingredients | Parts by Weight |
| --- | --- |
| natural rubber, smoked sheet | 50 |
| styrene-butadiene rubber (SBR-1500) | 50 |
| stearic acid | 1 |
| zinc oxide | 3 |
| carbon black, furnace (H-A-F black) | 35 |
| naphthenic oil plasticizer (Circosol 2-XH) | 10 |
| polytrimethyldihydroquinoline (Age rite resin D) | 1 |
| sulphenamide accelerator (NOBS Special) | 1.25 |
| 2-mercaptobenzothiazole (MBTS) | 0.25 |
| sulfur | 2.5 |

Rubber-Stock N

This rubber stock has the same composition as Rubber Stock A except that it contains no NOBS Special and it contains 1.0 part MBTS instead of 0.25 part as shown in the table for Stock A.

The amine-producing component of Rubber-Stock A is, of course, NOBS Special which is 2-(morpholinothio)-benzothiazole.

Other accelerators which have the potential of splitting out an amine or an amine free radical under vulcanization conditions are those which fall in the general classes of aryl substituted guanidines, aldehyde-amine condensation products, dithiocarbamates, thiuram disulfides, and benzothiazole sulfenamides. Some specific examples of commonly used accelerators in these classes are 2-(morpholinothio)-benzothiazole, N-cyclohexylbenzothiazole-2-sulfenamide, N,N-diisopropylbenzothiazole-2-sulfenamide, N-tertbutyl-benzothiazole-2-sulfenamide, piperidinium pentamethylenedithiocarbamate and tetramethylthiuram disulfide. The present invention provides protection for polyester filaments in elastomers compounded with any of these accelerators.

LABORATORY ACCELERATED AMINOLYSIS TEST

In addition to the above-described rubber pad test it is many times more convenient in the laboratory to determine the effectiveness of a potential degradation inhibitor by means of the following accelerated aminolysis test (A.A.T.). The results of this very severe test show good correlation with actual in-rubber laboratory pad tests as well as full-scale tire tests. The test involves heating a treated length of yarn or cord with aqueous morpholine in a sealed tube and measuring the change in breaking strength. A sample of yarn or cord is prepared, e.g., by coating with the desired amount of degradation inhibitor, and its breaking strength accurately measured on an Instron tensile tester Two 5.0 ±0.2 gms. skeins of the yarn or cord are made up; one is inserted into a 90 ml. glass tube along with 1.00 ml. of water, and one is inserted into a 90 ml. glass tube along with 1.00 ml. of 0.50 weight percent morpholine in water. (In some instances 0.8 percent morpholine is used.) The tubes are sealed and heated to a temperature of 140° ±2° C. for 16.0 ±0.2 hours (alternatively, tests may be run at 130°C. to show lower temperature effects.) Upon completion of heating, the tubes are cooled, opened, and the skein removed for testing. After drying in air, the breaking strength of the yarn or cord is determined on an Instron tensile tester. For the results reported here, Instron tests are made on a 10-inch (25.4-cm.) sample using a cross-head speed of 6 inches/min. (15.2 cm./min.).

For comparison, similar tube tests are also run on yarn or cord which has not been treated with a degradation inhibitor (dipped in $H_2O$ only). These samples are labeled "control samples". For both test samples (coated with inhibitor) and control samples (dipped in water only), the breaking strength (B.S.) of a sample aged in aqueous morpholine is subtracted from the B.S. of that sample aged in water only. This difference for the control sample ($\Delta_{control}$) is the amount of strength loss due to the amine. This difference is also calculated for the test sample ($\Delta_{test}$). The test and control samples are compared with the use of the following expression:

Inhibition Factor = $\Delta_{control} - \Delta_{test}$. A test sample which shows an Inhibition Factor of at least +2 lbs. (908 gms.), as calculated from the above expression, is considered to be a positive demonstration of the effectiveness of the inhibitor with which the test item is coated.

Where comparisons are made on the basis of "Percent Breaking Strength Loss," this percentage value is calculated by obtaining the difference between the initial sample breaking strength and the breaking strength of the same sample after heating in the tube, dividing this difference by the initial breaking strength and multiplying the result by 100.

OTHER TEST PROCEDURES

The term "relative viscosity" is used as an indication of polymer molecular weight and refers to the ratio of the viscosity of a 10 percent solution (2.15 gms. polymer in 20 ml. solvent) of polyethylene terephthalate in a mixture of 10 parts of phenol and 7 parts of 2,4,6-trichlorophenol (by weight) to the viscosity of the phenol-trichlorophenol mixture, per se, measured in the same units at 25°C. using an Ostwald viscometer.

Conventional analytical procedures may be used for the determination of the amount of inhibitor metal ion on the surface of the filaments. Suitable procedures are described, for example, in "Colorimetric Determination of Traces of Metals" by E. B. Sandell in Chemical Analysis, Vol. III, third edition, Interscience Publishers, New York (1959). The entire filament sample may be digested for analysis unless there is a possibility of contamination from additives within the polymer. In this case, the material on the filament surface may be extracted by a suitable solvent or the surface may be removed by alkali and the transition metal in the extract may be determined qualitatively and quantitatively by the chosen procedure.

It will be apparent that the invention is applicable to the use of filamentary polyester structures in any of the commonly used forms. That is, the polyester may be in the form of continuous or short length filaments, twisted or untwisted yarns, braided yarns, cable cords of a variety of constructions, strands, threads and the like.

The following examples illustrate preferred embodiments of the invention. Parts and percentages are by weight unless otherwise indicated.

EXAMPLE 1

This example illustrates an embodiment of the invention in which a degradation-inhibitor metal compound is coated on a drawn polyester yarn during yarn manufacture.

A finish mixture is prepared by mixing 98 parts of a random copolymer of ethylene oxide and propylene oxide capped on one end with a n-butoxy group (Ucon 50 HB-170, Union Carbide) with 2 parts of polyoxyethylene (9) nonylphenol (Igepal CO-630, Geigy) and diluting this oil phase with 400 parts water. To this aqueous mixture is added a sufficient quantity of $$FeNH_4(SO_4)_2 (\rho_2^{140} = 0.35)$$

to give a concentration of 5.6 percent by weight.

A 1,000-denier, 192-filament, clear (containing no $TiO_2$) polyethylene terephthalate yarn is prepared according to a procedure similar to that of Example I in U.S. Pat. No. 3,216,187. The yarn is drawn in a steam jet using a draw ratio of 6.25 and a draw speed of 3,000 yds./min. (2,750 m./min.). Between the draw jet and the draw rolls a finish applicator of the general type described by Walker in U.S. Patent No. 3,244,142 is used to apply the above-described finish mixture to the drawn yarn. The drawn yarn is wound up as a zero-twist yarn using a surface-driven package wind-up. (Sample A).

For comparison, a similar yarn is prepared under the same conditions with the exception that no $FeNH_4(SO_4)_2$ degradation inhibitor is used in the finish. (Sample B).

The two samples of yarn produced are found to have the following properties.

TABLE II

Yarn Properties

| Sample | A | B |
|---|---|---|
| $FeNH_4(SO_4)_2$ in Finish | 5.6% | None |
| Yarn RV | 63 | 63 |
| Carboxyls Eq./$10^6$ g. | 15 | 13 |
| Fe, gm. atoms per $10^6$ gms. yarn | 2 | 0.3 |
| Tenacity (gpd) | 9.6 | 10.2 |
| Elongation (%) | 12 | 13 |
| Initial Modulus (gpd) | 114 | 120 |
| AAT % Breaking strength Lost as Greige Cord* | 34% | 47% |

*The two yarn samples are used to prepare cords of 1,000/1/2 construction using 10.3 "Z" turns per inch (4.06 turns/cm.) in the ply and 10.6 "S" turns per inch (4.17 turns/cm.) in the cable. These greige cords are then tested for resistance to attack by amines in the Accelerated Aminolysis Test (AAT) described previously using 0.8 weight percent morpholine. The cord with $FeNH_4(SO_4)_2$ on its surface is found to give a 34 percent loss in breaking strength in the AAT test whereas the cord which had no $FeNH_4(SO_4)_2$ coating shows a loss of 47 percent. This difference in breaking strength loss is a dramatic demonstration of the improved performance provided by the transition metal compound.

Greige cord samples prepared as above are coated with an adhesive as described by Shoaf in U.S. Pat. No. 3,307,966, wherein the cord is first coated with an epoxide-isocyanate coating and dried in an oven using 8.0 percent applied stretch and a drying temperature of 218°C. for 60 seconds and then overcoated with a conventional resorcinol-formaldehyde latex mixture and dried using 4.0 percent controlled relaxation and a drying temperature of 218°C. for 60 seconds. These cords are then tested for resistance to amine attack in the laboratory rubber pad test described previously. The results of the test are shown in Table III.

The epoxide-isocyanate coating mixture used above is prepared by first mixing 148 grams of water, 50.1 grams of phenol-blocked methylene-bis-(4-phenolisocyanate)(Hylene MP) and 1.55 grams dioctyl sodium sulfosuccinate (Aerosol OT) and then milling in a ball mill for about 16 hours. 12.9 grams of this 25 percent dispersion of blocked isocyanate is then mixed with 83.7 grams water, 1.4 grams of a diglycidyl ether of glycerol (Epon 812) and 2.0 grams 2 percent aqueous gum tragacanth. This mixture is stirred for one hour just before using.

The RFL mixture used is prepared by first mixing 126.1 grams water with 10.84 grams 1.5 percent aqueous sodium hydroxide, 6.26 grams resorcinol and 9.16 grams 37 percent formaldehyde. This mixture is stirred for 5 minutes, allowed to stand for 6 hours, and then added, with stirring, to a mixture of 138.4 grams of 41 percent butadiene-styrene/vinylpyridine (70/15/15) copolymer (Gentac) latex, 34.66 grams water, and 6.44 grams 28 percent ammonium hydroxide. The final mixture is allowed to stand at least 16 hours at a temperature of 5°-10C. before using.

TABLE III

Performance in Laboratory Rubber Pad Test

| | | Breaking Strength Loss, % | |
|---|---|---|---|
| Sample | $FeNH_4(SO_4)_2$ in Finish | Rubber Stock A | Rubber Stock N |
| A | 5.6% | 18 | 18 |
| B | None | 28 | 15 |

Upon inspecting the table, it is important to note that in Rubber Stock N, which is free of amine-producing accelerator, strength loss for the two cord samples is approximately the same. In contrast, the strength loss of the test cord in Rubber Stock A is the same as if no amine were present, whereas the unprotected control cord suffers a strength loss nearly double that shown in the amine-free rubber.

Adhesive-coated test and control cords prepared as above are used to prepare automobile tires of a conventional design. The elastomer used is Rubber Stock A. Some of the tires are then subjected to a modified high-speed endurance test in which the tire is run against a steel wheel, 4 feet (1.22 meters) in diameter, at 75 mph. (120 km./hr.) under a load sufficient to give a desired tire temperature. Tire temperature is measured by a thermocouple located in the air chamber of the tire. After running for the desired length of time, the tires are dissected and cords pulled from the shoulder portion of the second ply for strength test on an Instron tensile tester. The breaking strength of test cord is compared with that of a similar cord pulled from a tire not subjected to the high speed endurance test. The results are shown in Table IV. Note that the cord samples protected by $FeNH_4(SO_4)_2$ degradation inhibitor consistently give less breaking strength loss than the control cord which is not protected.

TABLE IV

Strength Loss in Tire Tests

| | | % Breaking Strength Loss per 1,000 Miles | | |
|---|---|---|---|---|
| Sample | $FeNH_4(SO_4)_2$ in finish | at 96°C. | at 99°C. | at 102°C. |
| A | 5.6% | 4.0 | 10 | 17 |
| B | None | 6.1 | 13 | 22 |

EXAMPLES 2-7

These examples illustrate the effectiveness of metal salts of Table I in preventing aminolysis of polyester filaments.

Polyethylene terephthalate cord of 1,000/½ construction, with 11 turns-per-inch (4.3 turns-per-cm.) Z in the ply and 11 turns-per-inch (4.3 turns-per-cm.) S in the cable, is prepared from high-strength, 50 RV, 1,000-denier yarn made by a procedure similar to that of Example I in U. S. Pat. No. 3,216,187. Samples of the cord are dipped in specified test solutions and hot stretched in a commercial dip-stretch cord processing machine (Litzler Computreater) using an oven temperature of 218°C., an exposure time in the oven of 20 seconds and 8.3 percent applied stretch. The test solutions are aqueous solutions of the listed transition metal compound and have the concentrations shown in Table V. Cords dipped in pure water were used for comparison purposes.

Each cord prepared is subjected to the Accelerated Aminolysis Test (A.A.T.) described previously and examined for loss in breaking strength. The results are shown in Table V. A difference in breaking strength of 2 pounds (908 gms.) or more between test and control cord is considered significant. Note that each test sample shows better strength retention than its corresponding control sample.

putreater). The blocked-isocyanate epoxide coating is applied and dried for 60 seconds at a temperature of 229°C. while the cord is undergoing 8 percent applied stretch. The RFL "overcoat" is applied and dried for 60 seconds at 218°C. while the cord undergoes a controlled relaxation of 4 percent. The adhesive-treated test and control cords are then subjected to the laboratory pad test in which the pads are aged in 0.5 atmosphere water vapor at a temperature of 160°C. for the times indicated. The results are shown in the following table.

TABLE VII

| Sample | Breaking Strength Loss, % | | |
|---|---|---|---|
| | Rubber Stock A | | Rubber Stock N |
| | 16 hrs. | 24 hrs. | 24 hrs. |
| A | 15 | 19 | 25 |
| B | 21 | 28 | 24 |

The data in Table VII clearly show that, whereas the test and control samples are essentially equivalent in a rubber stock free of an amine source (rubber stock N), the $ZnSO_4$-

TABLE V

| Example | Compound | Dip concentration (wt. percent) | Approximate metal-on-yarn | | Aging conditions | Change in breaking strength (A.A.T. results) | | |
|---|---|---|---|---|---|---|---|---|
| | | | (p.p.m.) | Gm. atoms per 10⁶ gm. | | Δ control | Δ test | Inhibition factor |
| 2 | $ZnSO_4 \cdot 7H_2O$ | 7.2 | 895 | 14 | j | 10 | 0 | 10 |
| 3 | $FeNH_4(SO_4)_2 \cdot 12H_2O$ | 5.9 | 575 | 10 | k | 7 | −2 | 9 |
| 4 | $NiSO_4 \cdot 6H_2O$ | 17.0 | 675 | 11 | k | 4 | −1 | 5 |
| 5 | $Na_3Co(NO_2)_6$ | 6.0 | 350 | 6 | j | 8 | 5 | 3 |
| 6 | $Zn(NO_3)_2 \cdot 6H_2O$* | 7.1 | 620 | 9 | j | 4 | 1 | 3 |
| 7 | $Cd(NO_3)_2 \cdot 4H_2O$ | 5.2 | 750 | 7 | k | 4 | −1 | 5 |

* Compound applied to yarn during yarn manufacture, as in Example 1.
NOTE.—Aging Conditions: j=140° C. for 16 hrs. using 0.5 wt. percent aqueous morpholine; k=130° C. for 16 hrs. using 0.8 wt. percent aqueous morpholine.

EXAMPLE 8

This example illustrates an embodiment of the invention in which a preferred degradation inhibitor is coated on a drawn polyester yarn under conditions similar to those encountered in a tire yarn beaming operation.

A standard commercial high-strength high-molecular-weight polyethylene tetephthalate tire yarn having a denier of 1,000 and composed of 192 filaments is treated with aqueous coating solutions on a coning machine operating at 140 yds./min. (128 meters per minute). For test yarn A, the aqueous coating solution is a 4.0 wt. percent solution of $ZnSO_4$ in water. The amount of zinc metal ion on the coated yarn is approximately 14 gram-atoms per 10 gram fiber. For comparison, a control sample B is prepared using pure water as the coating solution.

The test and control yarns are each converted to a 1,000/½ cord using 10.5 turns Z per inch (4.1 turns per cm.) in the ply and 10.8 turns S per inch (4.2 turns per cm.) in the cable.

The two cord samples, without an adhesive coating, are then subjected to the accelerated aminolysis test in which skeins of cord are heated in a sealed tube with 0.8 wt. percent aqueous morpholene for 26 hours at 130°C. The following results are obtained.

TABLE VI

| Sample | A.A.T. Breaking Strength Loss | Inhibition Factor |
|---|---|---|
| A | 9% | 7 |
| B | 34% | — |

For the laboratory pad test, samples of test and control cords are coated with an adhesive as described previously, using a commercial dip-stretching machine (Litzler Comcoated test sample is clearly superior in a rubber stock containing an amine producing accelerator (rubber stock A).

EXAMPLE 9

This example illustrates a preferred embodiment of the invention in which a drawn polyester yarn coated with a metal salt inhibitor is used in combination with a neutral adhesive mixture. The neutral RFL mixture used is prepared from a "resin master" made by dissolving 49.0 gms. resorcinol in 98.3 gms. water and adding 26.6 gms. 37 percent formaldehyde. This resin master is aged for one hour at room temperature and then added to 288.0 gms. of 41 percent butadiene/styrene/vinylpyridine (70/15/15) copolymer (Gentac) latex. After aging 4 days, the concentration is adjusted for use by diluting 300 gms. of the mixture with 255 gms. of water. The pH is 7.5.

A 989 denier polyethylene terephthalate test yarn composed of 192 filaments having a polymer relative viscosity of 48.6 and characterized by a yarn tenacity of 9.0 gms. per denier and a break elongation of 13.3 percent is treated with a 4.0 weight percent solution of $ZnSO_4$ in water on a coning machine as in Example 8. A sample of control yarn is treated in a similar manner with the exception that water is used in place of the $ZnSO_4$ solution. Each yarn is then used to make a 989/1/2 cord having 10.5 Z turns per inch in the ply and 10.7 S turns per inch in the cable. Analysis off the test cord for zinc shows that the cord bears a coating of 30 gm. atoms of zinc per million gms. of cord (1,981 ppm.). In the same analysis, the control cord gives only a trace of zinc (45 ppm.).

Samples of test and control cords are treated with the blocked-isocyanate/epoxide adhesive precoating mixture described previously and dried at 445°F. (230°C.) in an oven using an exposure of 60 sec. and sufficient tension to give 8.0 percent applied stretch. The precoated cords are then overcoated with the neutral RFL adhesive mixture described above and dried at 425°F. (219°C.) in an oven using an exposure time of 60 sec. and with the tension adjusted to give 4.0 percent controlled relaxation.

The adhesive-treated test and control cords are then subjected to the accelerated aminolysis test in which a 4 gm. skein of cord is heated in a 90 ml. sealed tube with 1.0 ml. of 5.0 percent aqueous morpholine for 16 hours at 140°C. For comparison, a cord sample is also heated in a sealed tube containing distilled water only. Cord strength is determined at 70°F. (21°C.) on an "Instron" tensile testing machine using a 10 inch (25.4 cm.) sample length and a testing rate of 120 percent per minute. The results of the tests are summarized in Table VIII. Inspection of the data reveals the remarkable protection against attack by morpholine afforded by treating polyester filaments with $ZnSO_4$ in accordance with the present invention.

TABLE VIII

| Cord Sample | $ZnSO_4$ Coating | Tube Test Reagent | Cord Breaking Strength After Tube Test lb. (Kg) | | % Loss |
|---|---|---|---|---|---|
| Control | No | Water | 27 | (12.2) | 22 |
| Test | Yes | Water | 28 | (12.7) | 19 |
| Control | No | Morpholine | 17 | (7.7) | 51 |
| Test | Yes | Morpholine | 26 | (11.8) | 24 |

The excessive degradation previously observed when high strength polyethylene terephthalate filaments are heated in contact with rubber may be considered, by present theories, to be a summation of three chemically different types of degradation: hydrolytic degradation caused by water in the rubber; degradation from aminolysis by amines generated by certain rubber accelerators; and a small amount of purely thermal degradation. A method of sharply reducing hydrolytic degradation in polyesters was described by Daniels in U.S. Pat. No. 3,051,212. The present invention provides a method of almost completely eliminating degradation by aminolysis. By combining the invention of Daniels with the present invention, the problem of in-rubber degradation of polyester filaments is reduced to insignificance, for all practical purposes. Thus, the last restriction has now been removed from the use of polyester-filament-reinforced elastomeric articles in areas of severe service conditions and the many well-demonstrated advantages of polyester filaments have been made available for all conditions of service.

EXAMPLE 10

This example illustrates an embodiment of the invention in which a preferred degradation inhibitor is used in combination with a preferred adhesive subcoating. Improved adhesion retention is observed.

The supply yarn used is a commercial 192-filament polyethylene terephthalate yarn having a total denier of 1,000 and composed of polymer having a relative viscosity of 50.9, a $TiO_2$ content of 0.089 wt. percent, a free carboxyl content of 27.2 equivalents per million grams, and an ether content of 1.3 mol percent. The drawn yarn is passed over a pair of feed rolls (½ wrap), then through a slot applicator where 0.5 wt. percent of liquid polymethylene-polyphenylisocyanate (PAPI) is applied, then over a rotating finish roll where about 0.5 wt. percent of a liquid mixture of di-2-ethyl-hexanoate of polyethylene glycol (MW-400) and a phenolic antioxident is applied and then wound up on a bobbin. The treated yarn from the bobbin is next passed over a finish roll bathed in a 16 percent aqueous solution of zinc sulfate which is rotating at a speed sufficient to apply 200 ppm of zinc to the yarn. The treated yarn is again wound on a bobbin.

For comparison, a first control yarn (C1) is prepared by passing a sample of the same supply yarn through the same process steps as above, with the exception that no zinc sulfate solution is applied to the yarn. This yarn sample is coded "Sample C1."

A second control yarn (C2) is prepared by passing a sample of the same supply yarn through the same mechanical operations as the test yarn without applying any surface treating liquids. This yarn sample is coded "Sample C2."

Test and control yarns prepared as above are used to prepare tire cord of 1000/½ construction using 10.5 turns per inch (4.14 turns per cm.) in the ply (Z twist) and 10.8 turns per inch (4.25 turns per cm.) in the cable (S twist). Each cord sample is precoated by treating with the epoxide/isocyanate adhesive coating described in Example I, using a drying time of 60 seconds at 455°F. (235°C.) with an applied stretch of 8.0 percent. This precoated cord is next overcoated with the RFL mixture of Example I and dried using 4.0 percent controlled relaxation and a drying temperature of 426°F. (219°C.) for 60 seconds.

For testing, the treated cord is used to prepare a two-ply test rubber pad similar to the laminated structure described under the laboratory pad test for aminolysis resistance with the exception that the outer layers of 125 mil sheets of unvulcanized rubber are replaced with a layer of cotton canvas plus one 15-mil layer of rubber. Curing conditions are as described previously. Test strips of the two-ply rubber pads are then examined for adhesion retention by heating the strips at 160°C. in 0.5 atmosphere water vapor for various periods of time. After heating, the force required to separate the two plies of cord is then measured at a temperature of 140°C. with the results shown in Table IX. It is noted that adhesion retention of the test cord under the test conditions is excellent.

TABLE IX

Two-Ply Strip Adhesion (140° C.)

| Hours Aged | Adhesion, lbs./in.² | | |
|---|---|---|---|
| | Test Sample | Sample C1 | Sample C2 |
| 0 | 28 | 26 | 24 |
| 8 | 26 | 24 | 24 |
| 16 | 25 | 22 | 22 |
| 24 | 24 | 20 | 14 |
| 30 | 23 | 17 | 7 |
| 42 | 18 | 12 | — |
| 66 | 14 | 10 | — |

A repeat of the test sample procedure with the $ZnSO_4$ and PAPI being applied to the yarn in reverse order also gives good results in the adhesion retention test.

I claim:

1. High-strength polyester yarn of drawn filaments of polyethylene terephthalate having a relative viscosity above 40, the filaments having a durable surface coating of a degradation inhibitor comprising a salt of a metallic element having an atomic number within the ranges 22–30 and 40–48 to provide 2 to 40 gram-atoms of the metallic element per million grams of the filaments, and a coating of adhesive for bonding to an elastomer compounded with an amine-producing accelerator, said salt having a $$\rho_2^{140}$$

value of at least 0.2 in the test for amine-absorption.

2. Polyester yarn as defined in claim 1 wherein said degradation inhibitor comprises a salt of a metallic element of atomic number 26–30.

3. Polyester yarn as defined in claim 1 wherein said degradation inhibitor comprises an inorganic salt of a metallic element of atomic number 26–30.

4. Polyester yarn as defined in claim 1 wherein said degradation inhibitor comprises zinc sulfate.

5. Polyester yarn as defined in claim 1 wherein said degradation inhibitor comprises ferric ammonium sulfate.

* * * * *